US005390276A

United States Patent [19]
Tai et al.

[11] Patent Number: 5,390,276
[45] Date of Patent: * Feb. 14, 1995

[54] BACKLIGHTING ASSEMBLY UTILZING MICROPRISMS AND ESPECIALLY SUITABLE FOR USE WITH A LIQUID CRYSTAL DISPLAY

[75] Inventors: Chen-Yu Tai; Han Zou; Zhan Chen, all of Toledo, Ohio

[73] Assignee: Briteview Technologies, Toledo, Ohio

[*] Notice: The portion of the term of this patent subsequent to Oct. 25, 2011 has been disclaimed.

[21] Appl. No.: 958,238

[22] Filed: Oct. 8, 1992

[51] Int. Cl.⁶ ............................................... G02B 6/04
[52] U.S. Cl. ....................................... 385/146; 362/32
[58] Field of Search .................... 385/146, 147, 901; 362/26, 31, 330, 806; 358/901

[56] References Cited

U.S. PATENT DOCUMENTS

| | | | |
|---|---|---|---|
| 4,917,465 | 4/1990 | Conner et al. | 350/335 |
| 5,050,946 | 9/1991 | Hathaway et al. | 385/33 |
| 5,187,765 | 2/1993 | Muehlemann et al. | 385/901 X |
| 5,202,950 | 4/1993 | Arego et al. | 385/901 X |
| 5,226,105 | 7/1993 | Myers | 385/901 X |

OTHER PUBLICATIONS

"Retroreflecting Sheet Polarizer", M. F. Weber, SID 92 Digest, pp. 427–429.

*Primary Examiner*—Akm E. Ullah
*Attorney, Agent, or Firm*—Gray Cary Ware & Freidenrich

[57] ABSTRACT

An assembly for backlighting a liquid crystal display is disclosed herein along with the liquid crystal display itself and a specific light polarization arrangement. The assembly for backlighting the liquid crystal display includes a backlighting light pipe into which light is directed in a particular manner and a specifically configured arrangement of immediately adjacent microprisms which cooperate with the backlighting light pipe for reflecting light within the ladder upwards through one of its surfaces in a generally collimated manner. The liquid crystal display backlighting assembly is also disclosed including a specifically designed arrangement for collimating the light directed into the light pipe such that the light exiting the light pipe does so on a more collimated manner.

40 Claims, 6 Drawing Sheets

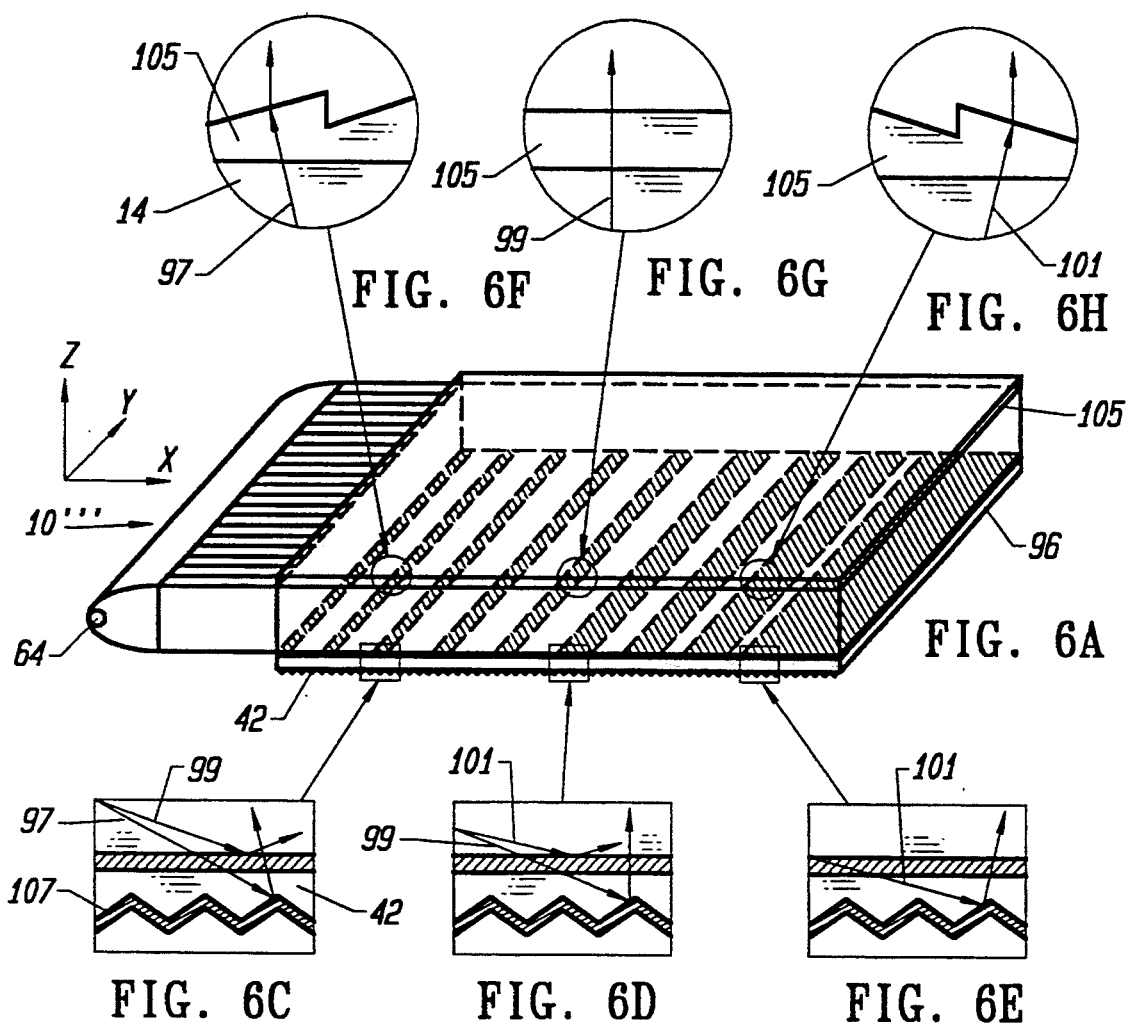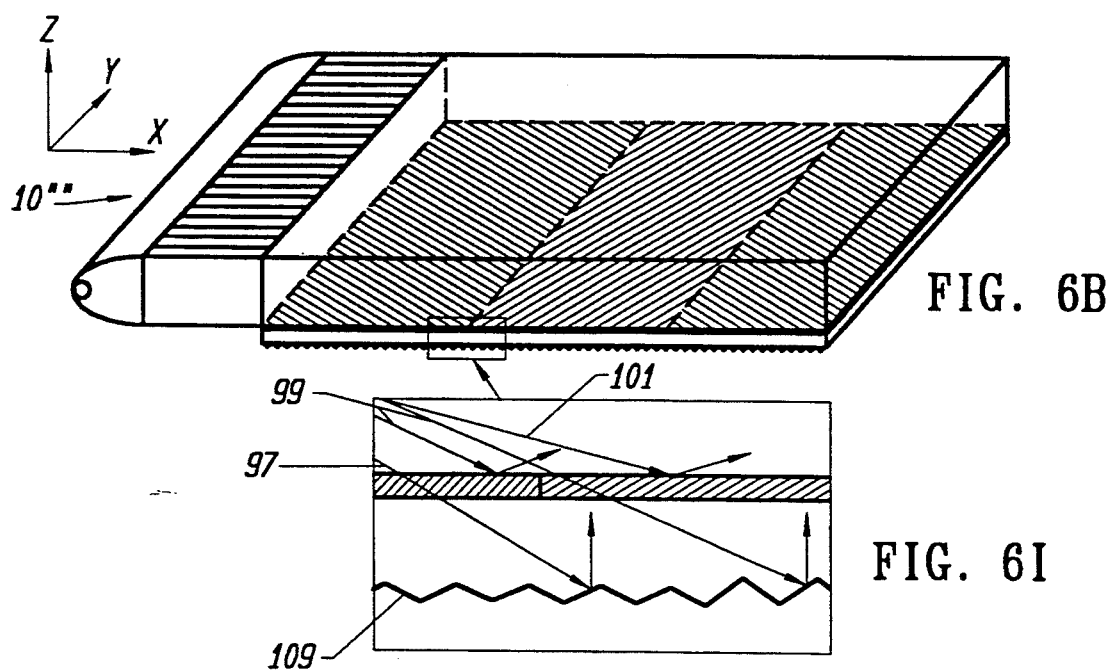

BACKLIGHTING ASSEMBLY UTILZING MICROPRISMS AND ESPECIALLY SUITABLE FOR USE WITH A LIQUID CRYSTAL DISPLAY

BACKGROUND OF THE INVENTION

1. Field of the Invention

The present invention relates generally to backlighting systems especially suitable for use with liquid crystal displays, and more particularly to (1) a specifically designed backlighting assembly capable of providing collimating backlight illumination; (2) a specifically designed arrangement for polarizing the collimated light exiting the backlighting assembly; and (3) an arrangement in cooperation with the backlighting assembly and its associated liquid crystal display for ensuring that the latter can be easily viewed from substantially all angles.

2. Description of the Related Art

Liquid crystal displays (LCDs) are commonly used in portable computer systems, televisions, and other electronic display devices. Large area, high performance LCDs require a source of lighting for operation. Backlighting the LCD has become the most popular source of light in personal computers, televisions, as well as projector type displays. In general, there is a need to obtain a sufficiently bright backlight level with as little power consumption as possible. Uniformity of the backlighting as well as small space for convenience of portability are also desirable. In most of the lighting systems, light is not collimated which makes it impossible for use in applications like, for example, triple supertwist nematic liquid crystal displays (TSTN) which need highly collimated backlighting. Although some approaches have been proposed to obtain collimated backlighting for the TSTN display, they all need a point light source and an optical system based on lenses and mirrors. Since a point light source is generally less efficient than a fluorescent lamp and requires a cooling system such as a fan, and optical systems based on lenses and mirrors take up a large space, techniques for highly collimated light sources presented heretofore were not practical for the backlighting of portable computers and flat television sets. For this reason, the TSTN and other stacked panel technology is limited to projector type display at this moment. On the other hand, as will be seen hereinafter, with the backlighting assembly designed in accordance with the present invention, a highly collimated light source which uses little space and consumes little power may be applied to techniques such as TSTN and make it suitable for colored display in portable computers as well as flat real time video displays.

In addition to the need for a relatively small, low powered but highly collimated backlighting arrangement for liquid crystal displays, there is a need to reduce the way in which viewing of a typical prior art liquid crystal display is dependent upon the angle at which it is viewed. As will also be seen hereinafter, a specific light diffusing plate member is combined with the backlighting assembly disclosed herein and the liquid crystal display itself for minimizing this angular dependence. A viewing angle insensitive LCD is particularly desirable for video applications such as "television on wall".

A particular shortcoming associated with liquid crystal displays resides in the fact that most LCDs require polarized light. Most polarizers are light inefficient, that is, at least half of the light is lost as a result of the polarizing process. As will be seen hereinafter, a specifically designed polarizer is combined with the backlighting assembly disclosed herein such that substantially all of the light exiting the backlighting assembly and entering the liquid crystal display is polarized.

With particular regard to the specific backlighting assemblies disclosed herein, two U.S. Patents are worth noting. They are U.S. Pat. Nos. 4,917,465 (Conner et al.) and 5,050,946 (Hathaway). This latter patent discloses a number of different backlighting assemblies for use with a liquid crystal display. In each of the embodiments illustrated, except one, a longitudinally extending light pipe is combined with a light source at one end thereof and means within or forming part of the light pipe for redirecting light entering one end thereof back out of the light pipe along one surface of the latter in confronting relationship with the liquid crystal display. In all of these embodiments, the light provided for use by the liquid crystal display is not highly collimated, certainly not to the degree achieved by the backlighting assembly of the present invention. In the Conner et al. patent, a number of backlighting arrangements are disclosed utilizing various lens systems. In most of these cases, a high degree of light collimation is not achieved. In other cases, while the embodiments illustrated generate collimated light, they do so by means of point light sources in combination with bulky lenses and mirrors.

SUMMARY OF THE INVENTION

As will be described in more detail hereinafter, an assembly for backlighting a liquid crystal display is disclosed herein. This assembly includes a backlighting light pipe extending lengthwise between opposite ends and having opposing top and bottom surfaces and opposing sides, means for directing light into the light pipe and for causing it to move from one end of the light pipe towards the opposite end thereof, and an arrangement of immediately adjacent microprisms extending normal to the lengthwise axis of the light pipe from one side of the latter to its opposing side along the entire extent of and serving as the bottom surface of the light pipe. In a preferred embodiment of this latter arrangement of microprisms, each microprism has a triangular cross-section extending downward to a point so as to define from that point opposing, upwardly angled light reflecting surface segments for reflecting light within the light pipe upwards through its top surface in a generally collimated manner.

In one embodiment of the backlighting assembly disclosed herein, its light pipe is divided into a series of longitudinally extending laterally adjacent light pipe sections or channels which extend from one end of the light pipe to its other end and which are optically isolated from one another along substantially their entire lengths, whereby the individual light pipe sections act on incoming light substantially independent of to one another. As will be seen, this multichannel configuration allows for the use of a fluorescent or other such linear light source, while at the same time achieving the desired collimation of light exiting the assembly. There is also disclosed herein a backlighting assembly designed in accordance with a second embodiment. In this embodiment, the light pipe does not have to be divided into multichannels. Rather, a separate multichannel collimating segment may be provided between the light pipe and light source. In that way, before the light actually enters the light pipe from one end thereof, it is collimated to an extent sufficient to allow it to be directed out of the light pipe by means of the microprisms in a highly collimated manner. In this latter embodiment, the light pipe itself may be comprised of multichannels, a single channel from side to side and from top to bottom, or it may be divided into upper and lower single sections which are optically coupled together in a way that enhances the uniformity of illumination across the assembly, as will be described.

While the present invention provides for a number of unique backlighting assemblies, it also provides for a unique system which includes a backlighting assembly in combination with a liquid crystal display and a specifically designed light polarizing arrangement which, in combination with the backlighting assembly, ensures that substantially all of the light from the backlighting assembly for use by the liquid crystal display is appropriately polarized. This is to be contrasted with prior art polarization schemes in which only at most about one half of the available light from the backlighting assembly is properly polarized. In the particular embodiment disclosed herein, the polarizing arrangement utilizes a retroreflecting sheet polarizer in cooperation with the microprisms forming part of the backlighting assembly to provide the appropriate polarization of light exiting the backlighting assembly.

Other features of the present invention will become apparent hereinafter, including the ability to provide a liquid crystal display that can be viewed from wide angle with picture degradation.

DESCRIPTION OF THE DRAWINGS

The present invention will be described in more detail hereinafter in conjunction with the drawings, wherein:

FIG. 6A with blowups FIGS. 6C, 6D, 6E, 6F, 6G and 6H is a perspective view of a backlighting system designed in accordance with a fourth embodiment of the present invention;

FIG. 6B with blowup FIG. 6I is a perspective view of a backlighting system designed in accordance with a fifth embodiment of the invention;

DETAILED DESCRIPTION

Figure 1:
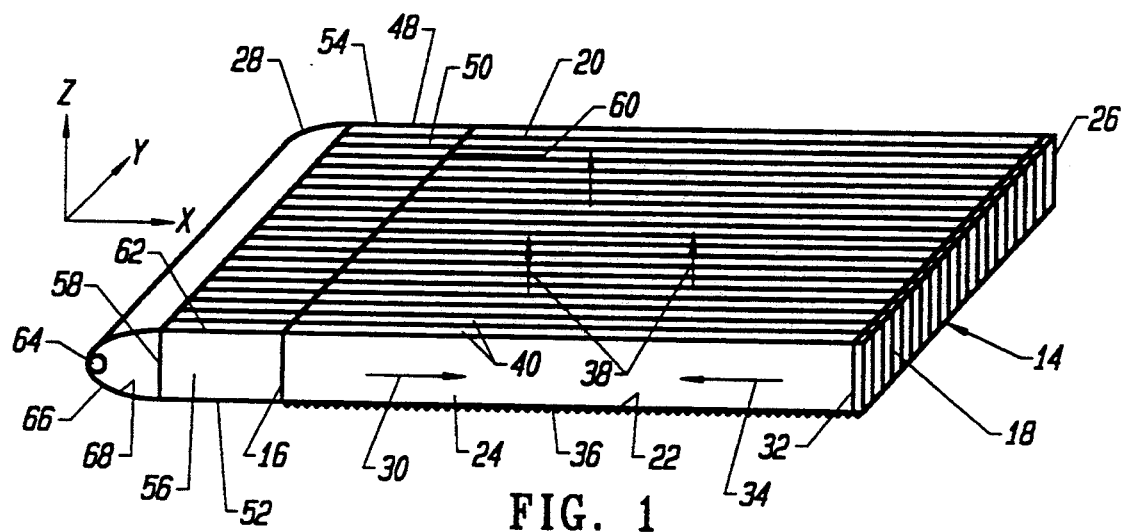
FIG. 1 is a perspective view of a backlighting assembly which is designed in accordance with the present invention and which is shown in combination with a liquid crystal display, the backlighting assembly being shown in an x-y-z coordinant system for purpose of convenience.

Turning now to the drawings, wherein like components are designated by like reference numerals throughout the various figures, attention is first directed to FIG. 1. As indicated above, this figure illustrates in perspective view an assembly designed in accordance with the present invention for backlighting a liquid crystal display. The assembly is shown at 10 within an x-y-z coordinate system, and the liquid crystal display is generally indicated by the reference numeral 12. Assembly 10 includes a backlighting light pipe 14 which extends lengthwise (in the x direction) between opposite ends 16 and 18, and which has opposing top and bottom surfaces 20 and 22, respectively, extending horizontally (in the x-y plane) and opposing sides 24 and 26. An arrangement generally indicated at 28 is provided for directing light into the light pipe at its entry end 16, and for causing the light to move from entry end 16 towards the opposite end 18, as indicated generally by arrow 30. End 18 includes a light reflecting surface 32 for reflecting light back towards entry end 16, as indicated generally by arrow 34.

Still referring to FIG. 1, backlighting assembly 10 also includes an arrangement 36 of immediately adjacent microprisms extending normal to the lengthwise axis of the light pipe (in the y direction) from one side of the light pipe to its opposite side along the entire extent of and serving as the bottom surface of light pipe 14. As will be seen hereinafter, as light is introduced into the light pipe at its entry end 16 by means of arrangement 28, light is reflected upwards through top surface 20 in the direction of liquid crystal display 12, as indicated generally by means of arrows 38. As will also be seen, this arrangement of microprisms and arrangement 28 are individually designed and designed to cooperate with one another so as to ensure that the light 38 exiting the light pipe through surface 20 does so in a highly collimated manner.

With specific reference to the light pipe 14, it should be noted that in the particular embodiment illustrated, it is divided into a series of longitudinally extending, laterally adjacent light pipe sections 40 which extend from one end of the light pipe to its other end and which are optically isolated from one another along substantially their entire lengths, whereby the individual light pipe sections act on incoming light from arrangement 28 substantially independent of one another. In actuality, each of these light pipe sections is a rectangular light pipe placed side by side against an adjacent rectangular light pipe and the entire group of rectangular light pipes are glued together only at their common ends 18. An air gap is provided between the adjacent sides of these rectangular light pipes or light pipe sections 40 so that there is very little light coupling between adjacent sections and therefore each light pipe section propagates light independently. The various light pipe sections 40 may be constructed of any suitable material, for example acrylic glass or polycarbonate, and each is provided with a suitable light reflecting end 32.

Figure 3:
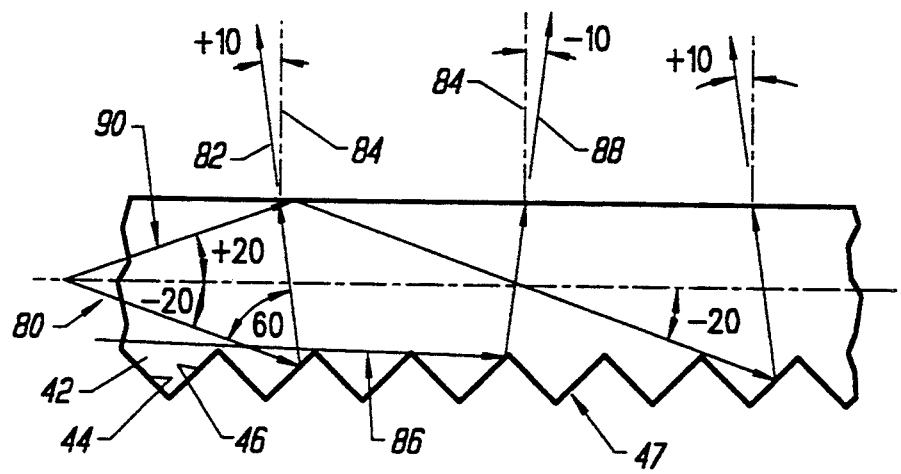
FIG. 3 is a sectional view of a portion of a backlighting light pipe forming part of the backlighting assembly of FIG. 1, specifically illustrating the way in which light enters and exits the light pipe.

As stated previously, overall backlighting assembly 10 includes an arrangement 36 of immediately adjacent microprisms extending normal to the lengthwise axis of the light pipe from one side of the latter to its opposing side along the entire extent of and serving as the bottom surface of light pipe 14. In the particular embodiment illustrated in FIG. 1, each of the microprisms, Which is generally indicated at 42 in FIG. 3, has a triangular cross section (isosceles) extending downward to a point so as to define from that point opposing, upwardly angled light reflecting surface segments 44 and 46 for reflecting light within the light pipe upwards through its top surface in a generally collimated manner, as will be described in more detail hereinafter. For the moment, it suffices to say that this arrangement of microprisms may be constructed of any suitable material such as acrylic glass or polycarbonate having the same or approximately the same index of refraction as light pipe 14. Arrangement 36 may be a separate and distinct arrangement from the light pipe, for example in the form of a separate sheet having a grooved underside 47 (see FIG. 3), as illustrated in FIG. 1, in which case the arrangement could be readily bonded to the bottom surface 22 of the light pipe by means of suitable adhesive having the appropriate index of refraction so as to be transparent to light passing between the light pipe and microprisms. On the other hand, as illustrated in FIG. 3, the arrangement of microprisms could be made an integral part of the light pipe. In either case, the size of the microprisms and the height of the light pipe sections have been exaggerated in order to more fully understand the way in which they act upon light introduced into the light pipe. In a contemplated embodiment, each of the light pipe sections 40 is 6 mm high, 1.125 mm wide, and may be of any desired length, for example, 20 mm. Each of the triangular microprisms in the same contemplated embodiment is 31 μm high from the base of the triangle to its tip. In the particular embodiment illustrated in FIG. 3, each prism defines a prism angle (the angle between reflecting surface segments) of 100°. It is to be understood that the present invention is not limited to these particular physical parameters. The microprism film can be coated with aluminum or other suitable means on its grooved surface 47 to enhance reflection.

Still referring to FIG. 1, overall arrangement 28 for introducing light into the light pipe through its end 16 will now be described in more detail. This arrangement includes its own light pipe, specifically a light collimating light pipe 48 having opposing top and bottom surfaces 50 and 52, opposing sides 54 and 56, and opposite ends 58 and 60. As illustrated in FIG. 1, light collimating light pipe 48 is disposed in end-to-end relationship with and directly adjacent to the light entering end 16 of backlighting light pipe 14 and the two are bonded together by suitable adhesive having the necessary optical properties to be essentially transparent to light passing between the two light pipes. Like light pipe 14, light pipe 48 is divided into a series of longitudinally extending, laterally adjacent and optically isolated light pipe sections 62, each of which is disposed in end-to-end alignment with an associated light pipe section 40 of light pipe 14. Each of these light pipe sections, like sections 40 of light pipe 14, can and preferably is a separate rectangular light pipe corresponding in cross-sectional dimensions to its associate light pipe section 40. Light pipe sections 62 may be provided as separate and distinct components from sections 40, as illustrated in FIG. 1, in which case the ends 60 of light pipe section 62 are suitably bonded to the ends 16 of light pipe sections 40 by suitable adhesive which is appropriately selected to be transparent to light passing between the adjoining sections. On the otherhand, each of the sections 62 could be integrally formed as part of its associated section 40, in which case confronting ends 16 and 60 would be eliminated. In either case, air gaps between sections 62 optically isolate the sections from one another.

In addition to light collimating light pipe 48, arrangement 28 for directing light into light pipe 14 is shown including a single elongated light source 64, for example a cold cathode fluorescent lamp or a hot cathode fluorescent lamp, extending immediately behind and in confronting parallel relationship with end 58 of light collimating light pipe 48 from one side 54 of the light pipe to its opposing side 56. The light source 64 is supported in this position by a fixture 66 which is suitably fixedly connected to the end 58 of light pipe 48 by readily providable means. In a preferred embodiment, the interior of fixture 66 defines a light reflecting parabolic or similarly curved surface 68 which in cross-section defines a laterally extending focal axis along which the light source 64 extends. In this way, light reflecting off of surface 68 will be directed into light pipe 48 generally normal to its end 58 and therefore generally parallel to the longitudinal axis of each of the light pipe sections 62 and 40. However, with the diameter of a lamp tube (~4 mm) not significantly smaller than the height of the light pipe (~6 mm), light entering the optical pipe system still cannot have the desired degree of collimation even in the x-z plane.

Having described overall backlighting assembly 10 from a structural standpoint, attention is now directed to the way in which this assembly functions to provide relatively highly collimated backlight 38 for use by liquid crystal display 12. In this regard, the way in which light from source 64 enters into and is acted on by the individual section 62 of light collimating light pipe 48 will be described, first with regard to light rays in the x-z plane and then with regard to light rays in the x-y plane. Thereafter, the way in which the backlighting light pipe and its cooperating microprisms act on the incoming light from light collimating light pipe 48 will be provided.

Figure 2A:
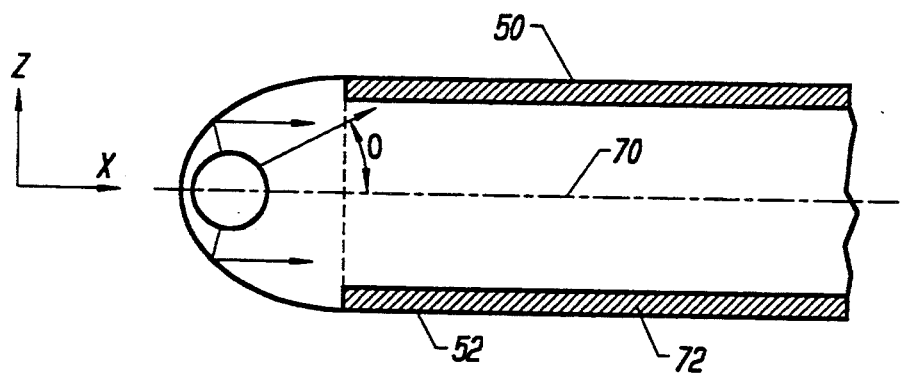
FIGS. 2A and 2B are sectional views of a collimating channel which forms part of a multichanneled collimating segment of the backlighting assembly of FIG. 1, taken in the x-z and x-y planes, respectively.

Turning now to FIG. 2A, the light source 64 and its associated fixture 66 is shown in combination with one of the light pipe sections 62 of light pipe 48 in the x-z plane. As indicated previously, the reflected light entering the light pipe section in this plane is relatively highly collimated as a result of the light reflecting surface 68. At the same time, the direct light entering the light pipe section from source 64 in the x-z plane does so at relatively low angles with respect to the longitudinal axis of the light pipe section. In this regard, as will be discussed hereinafter, it is important to keep the entry angle $\theta$ of the light entering the light pipe section to at most a certain maximum angle, where $\theta$ is defined by the entering light ray with respect to the longitudinally extending axis 70, as illustrated in FIG. 2A. If light is allowed to propagate down the light collimating light pipe and into the backlight light pipe at angles greater than a maximum angle θ, the backlight 38 will not be collimated to the degree desired. In the case of light entering each of the light pipe sections 62 in the x-z plane, because of the geometry between this section and the light source, the light source appears as a point source and thus most of the light propagates along the light pipe sections within the desired range of ±θ, for example, ±20°, as will be seen. If, in fact, it turns out that is not the case and that, in fact, light entering light pipe section 62 illustrated in FIG. 2A does so at greater angles, the top and bottom surfaces 50 and 52 can be provided with a suitable and readily providable optical coating 72 which is designed to have total internal reflection for light incident on their surfaces within the desired angle θ and absorb light incident on their surface outside those angles. Thus, the only light propagating through each of the light collimating light pipe sections 62 will do so within the desired collimation zone ±θ. An example of coating 72 is a specially prepared epoxy with a refractive index of 1.47. The outer surface of coating 72 may be painted with an opaque material.

Figure 2B:
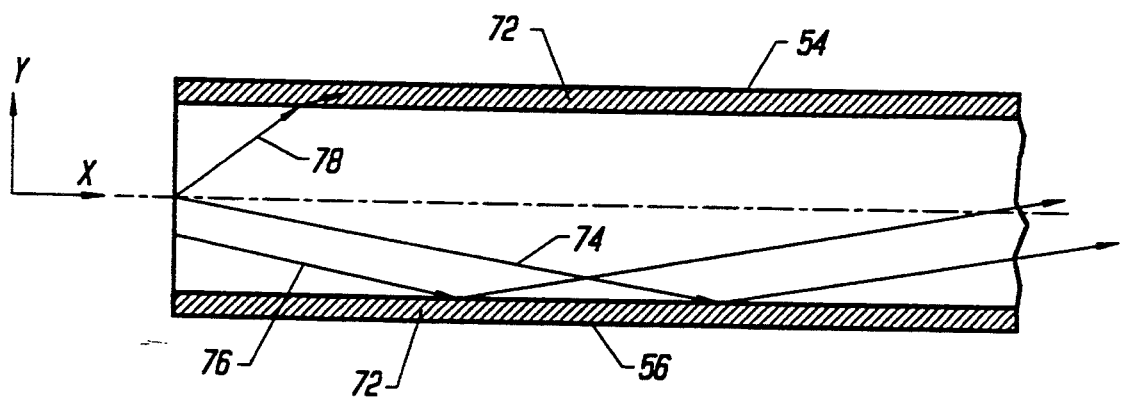

Having described the way light enters each of the light collimating light pipe sections 62 within the x-z plane, attention is now directed to the way in which the light enters each of these sections in the x-y plane, as illustrated in FIG. 2B. In this plane, it is far more likely that light will enter each light pipe section at angles outside the desired collimating zone, that is, at angles greater than the desired maximum angle ±θ. This is because in the x-y plane, the light source 64 appears as a line source, not a point source as in the x-z plane. As a result, while the top and bottom surfaces 50 and 52 of each light pipe section 62 may or may not include appropriate coatings 72 for limiting light reflection within the light pipe sections, opposing sides 54 and 56 of each light pipe section will most assuredly include such internal surface coatings, as indicated in FIG. 2B. Thus, the light rays entering each light pipe section within the desired collimating zone θ, for example, rays 74 and 76, will be reflected by total internal reflection from the surface coating 72. On the other hand, light rays entering each light section at angles outside the desired collimating zone, for example light ray 78, will be transmitted into the coating layer 72 reaching the painted outer surface of the coating and be absorbed by coating 72. As a result, substantially all of the light that propagates across each light pipe section within the x-y plane and within the x-z plane, will do so within the desired collimating zone. The maximum angle θ is determined by the arcsin $n_1/n_2$, where $n_1$ and $n_2$ are refractive indices of coating 72 and the collimating light pipe.

Having described the way in which light from source 64 is collimated by means of light collimating light pipe 48, attention is now directed to the way in which the backlighting light pipe 14 in cooperation with microprism arrangement 36 acts on this collimated light to provide collimated backlighting 38. To this end, reference is directed to FIG. 3 which illustrates a longitudinal segment of one light pipe section 40 in the x-z plane. For purposes of this discussion, it will be assumed that the maximum θ angle at which light enters the backlighting light pipe is ±20°, as depicted in FIG. 3. In this regard, it is to be understood that the light enters the backlighting light pipe within this range regardless of the plane within which the light enters. However, for purposes of discussion, only the activity taking place in the plane illustrated in FIG. 3 will be described. Also, as stated previously, microprisms 42, in the particular embodiment illustrated in FIG. 3, define adjacent angles of 100°.

Still referring to FIG. 3, note specifically the incoming light beam 80 which deviates by −20° from the axis of the light pipe will be bent by a microprism and then propagate in the direction 82 which exits the top surface 20 of the light pipe at a +10° angle from the normal 84. Light beam 86 which propagates nearly parallel to the axis of the light pipe will be bent by 80° and propagate out of the light pipe through top surface 20 at an angle of −10° with the normal to surface 20, as indicated at 88. Light beam 90 which initially deviates by +20° from the axis of the light pipe will hit the underside of top surface 20 and then propagate downwards whereupon it will be reflected by a prism in a way similar to light beam 80, thereby exiting the top surface 20 at an angle of +10° with the normal. This process happens to all light beams making a positive angle with the axis of the light pipe. Similarly, light beams propagating in the opposite direction will also propagate outward with a divergence of ±10° reflecting off a prism. As a result, all of the light beams exiting the light pipe through top surface 20 in the x-z plane will be collimated to one-half their original divergent angles, that is, within a collimating zone one-half that of the collimating zone of light entering light pipe 14.

In the particular example just described in conjunction with FIG. 3, it was assumed that the prisms 42 define angles of 100° between adjacent prisms and that the incoming light does so within a collimating zone of ±20° with respect to the axis of each light pipe section 40. For the purpose of coupling light out of a light pipe, the prism angle of the prism array should have an angle determined by the required collimation and the index of refraction of the light pipe. The prism arrays should have prism angles roughly equal to 90° plus the desired divergent angle. For practical use, there is no restriction on the size and repeat distance of the prisms as long as they can be conveniently manufactured and can be properly applied for backlighting. Nevertheless, it would be wise not to choose prism repeat distances close to the length of the pitches of the liquid crystal display, or their multiples, or dividers so that systematic effects on interference may be avoided.

Figure 4:
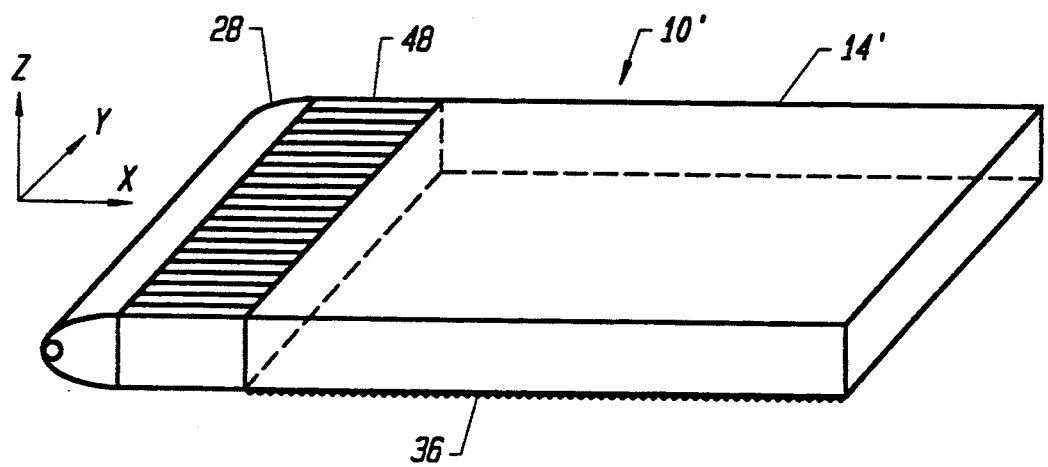
FIG. 4 is a perspective view of a backlighting assembly designed in accordance with a second embodiment of the present invention.

In a practical design of an overall backlighting assembly, there is no need for the multichannel structure illustrated in assembly 10 to extend across both the light collimating light pipe and the backlighting light pipe, as illustrated in FIG. 1. This is because light propagates in a straight line. As a result, once the light field is collimated by means of light collimating light pipe 48, it will continue to propagate as collimated light even if the backlighting light pipe is not divided into sections. FIG. 4 illustrates such an embodiment. Specifically, as seen there, a backlighting assembly 10' is depicted including all of the components of assembly 10, except for backlighting light pipe 14. Rather, backlighting light pipe 14' which is not divided into sections 40 is utilized.

Figures 5A, 5B:
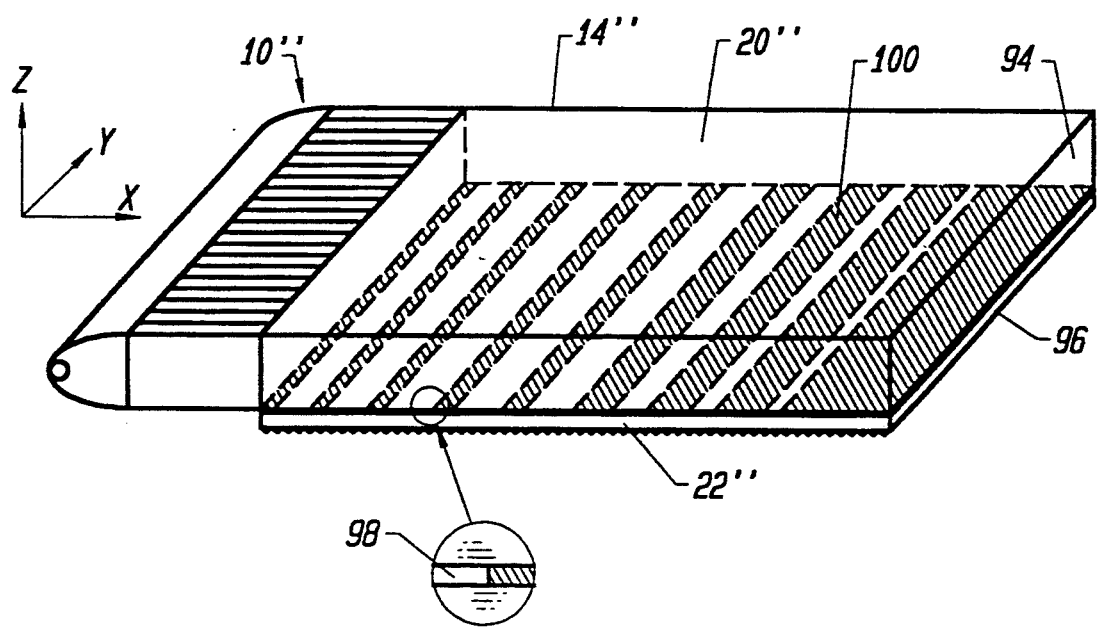
FIG. 5A with blowup
FIG. 5B is a perspective view of a backlighting assembly designed in accordance with a third embodiment of the present invention.

In each of the backlighting assemblies 10 and 10', a single light source is provided at one end of its associated backlighting light pipe. As a result, there tends to be a greater output intensity (output light 38) nearer to the lighted end then the unlighted end. FIG. 5 illustrates a backlighting assembly 10" that compensates for this lack of uniformity. Specifically, as seen in FIG. 5, assembly 10" includes all of the components of assemblies 10 and 10', except for its backlighting light pipe 14" which differs from light pipe 14 and 14'. Light pipe 14" includes the same outermost configuration as the other two light pipes and includes arrangement 36 of microprisms on its bottom surface. However, light pipe 14" is divided into an upper section 94 including top surface 20" of the light pipe and a bottom section 96 including the light pipe's bottom surface 22". Disposed between and along the entire extent of these sections is an air space 98 which serves to optically isolate one section from the other. Thus, light within upper section 94 from light source 64 is not able to reach lower section 96 and therefore microprism 42 through air space 98. However, as illustrated in FIG. 5, a series of longitudinally spaced optical coupling strips 100 are disposed between the upper and lower light pipe sections within the air gap 98 and extend from one side of the backlighting light pipe to the opposing side for optically coupling the upper and lower light pipe section to one another. These optical coupling strips progressively widen as a function of distance away from the light entering end of the backlighting light pipe while the spaces therebetween may decrease in width. As a result, light entering upper section 94 is only able to reach lower section 96 and the microprisms through the optical coupling strips and therefore more backlighting light escapes from the assembly through top surface 20" at locations away from the light source than does light close to the light source. This provides for more uniform backlighting.

In the embodiment just described and, indeed, in the other two embodiments, light is provided at one end of the assembly only. It is to be understood that a similar light providing arrangement can be utilized at the opposite end of each assembly. In this case, if not compensated for, the backlighting resulting from such an assembly will be brightest at opposite ends and less bright in the center. Such an assembly could readily utilize a backlighting light pipe similar to light pipe 14" with optical coupling strips that are widest in the center and less wide on either end, thereby providing more uniform backlighting. In either this latter embodiment or the one illustrated in FIG. 5, the optical coupling strips 100 can be readily provided of any suitable material, for example epoxy, or index matching liquid, so long as they do not change or substantially change the direction of the light passing therethrough.

One may also use glue or liquid of refractive index slightly smaller than that of the light pipe to couple the light pipe and microprisms in the section closer to the light source 64 and use glue or liquid of refractive index equal to or slightly larger than that of the light pipe in the sections further away from the light source as shown by assemblies 10''' and 10'''' in FIGS. 6A and 6B. With this arrangement, only light 97 (see FIG. 6B) with large deviation angle (with respect to the axis of the light pipe) can be coupled out of the light pipe in sections closer to the light source. Light with small deviation angles, like light 99, 101, 103, can be coupled out of the light pipe only in sections further away from the light source. As a result, the output light will have its deviation angle systematically distributed over the surface of the light pipe and therefore can be further collimated by using a Fresnel (cylindrical) lens sheet 105 as shown in FIG. 6A. With the example given before, light with a deviation angle of ±20°, which is coupled out of the light pipe by the microprisms 42 defining 100° angles will be disbursed over the whole light pipe surface with a divergence angle of ±10°, but with the 10° to 0° distributed in the half surface closer to the light source and with 0° to −10° distributed in the half surface further away from the light source. By using the Fresnel lens sheet 105 shown in FIG. 6A, light beams propagating with large deviation angle such as beams 97 and 101, amd exiting the light pipe near both ends of the pipe will have their propagation direction further corrected. Beams with a small deviation angle like beam 99 will come out of the light pipe in the central portion and will not be significantly affected by the Fresnel lens. As a result, light coming out of the backlighting system can achieve a very high degree of collimation in the x-z plane without sacrificing their intensity. Correction of the deviation angle of exit beams can also be achieved by using microprisms 107 of systematically changing angles as shown in FIG. 6B. With the above approaches, light entering the light pipe section with any deviation angle can be converted to collimated light and will therefore greatly enhance the efficiency of the invented backlighting system.

Figure 7:
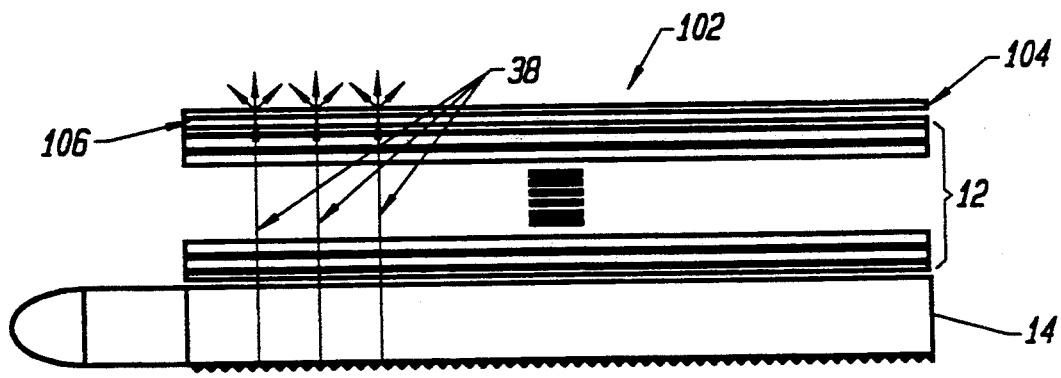
FIG. 7 is a diagrammatic illustration, in side elevational view, of an overall liquid crystal display system including a liquid crystal display, a backlighting assembly designed in accordance with the present invention, a polarizing arrangement which, in combination with the backlighting assembly, is designed in accordance with the present invention, and a light scattering diffusing plate.

Turning now to FIG. 7, attention is directed to an overall LCD system which is generally indicated by the reference numeral 102. This system includes one of the previously described backlighting assemblies, for example, backlighting assembly 14 in position directly under a liquid crystal display 12 which is shown in more detail in FIG. 7 than in FIG. 1. In addition to these components, system 102 includes a piece of matte sheet glass or other light diffusing transparent sheet 104 placed on top of the liquid crystal cell 12 which is illuminated by backlighting assembly 14. Since the light 38 coming out of the backlighting assembly is highly collimated (for example, ±10° as illustrated in FIG. 3), an image of the picture displayed on the liquid crystal cell, or liquid crystal cells as in the case of a TSTN arrangement, is formed on the scattering surface 106 of a diffuser sheet 104 just like real images formed by a projector on a screen. Light scatters from the diffuser surface and enters the viewers eye regardless of its angular position, thereby eliminating viewer angle sensitivity.

As is known, in most LCD operations, linearly polarized light is needed. In the typical case, a polarizer which is transparent for light polarized in a particular direction only is used to obtain polarized light. However, with the standard approach, less than half of the natural light can transmit through the polarizer as linearly polarized light of a given polarity because the other half, light polarized in the undesired direction, is rejected or absorbed by the polarizer. As will be described hereinafter, an LCD system which requires polarized light and which utilizes a backlighting assembly of the types previously described, is disclosed herein. However, as will also be seen, this particular system differs from prior art systems in that substantially all of the light from the backlighting assembly is polarized in the right direction and therefore usable in substantially its entirety by the liquid crystal display. To this end, the system to be described utilizes a known retroreflecting sheet polarizer of the type described in the publication entitled RETROREFLECTING SHEET POLARIZER by M. F. Weber in SID 92 Digest, page 427–429.

Figure 8:
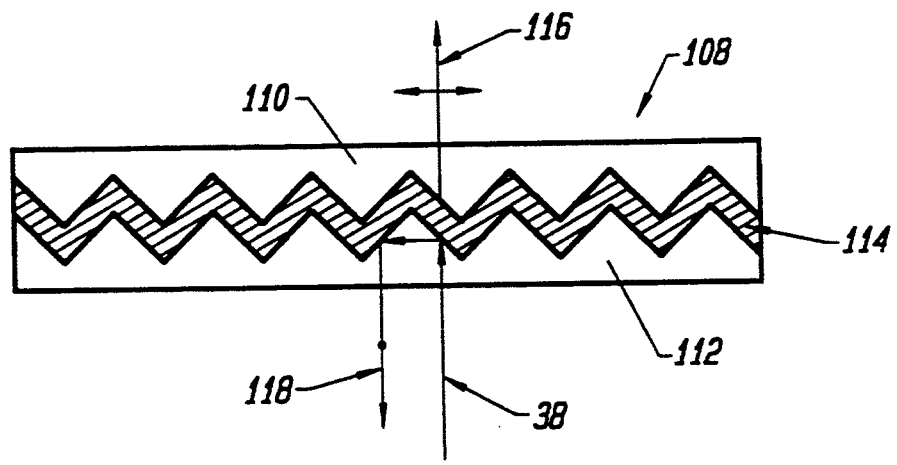
FIG. 8 is a diagrammatic illustration, in side elevation, of a retroreflecting sheet polarizer forming part of the polarizing arrangement illustrated in FIG. 6.

The retroreflecting sheet polarizer referred to immediately above is illustrated in FIG. 8 and generally designated by the reference numeral 108. This particular device is constructed by using two 90° microprism sheets, an upper sheet 110 and lower sheet 112 which are spaced apart in the manner shown in FIG. 8. These sheets, actually two Scotch ™ optical lighting films (SOLF films), as recited in the Weber publication, are joined by an optical adhesive after thin optical layers 114 are deposited on one or both of the mating microstructured surfaces. The refractive indices of neighboring layers are so selected that the normal incidence with respect to the bottom prisms 112 is just under the Brewster angle for the optical layer 114. As illustrated in FIG. 8, backlight 38 entering the polarizer results in the passage of p-polarized light 116, which is polarized in the plane of incidence containing the normal of the layer and the incident light, while s-polarized light 118, which is polarized perpendicular to the plane of incidence, is twice reflected for a 180° reversal of direction.

Figure 9:
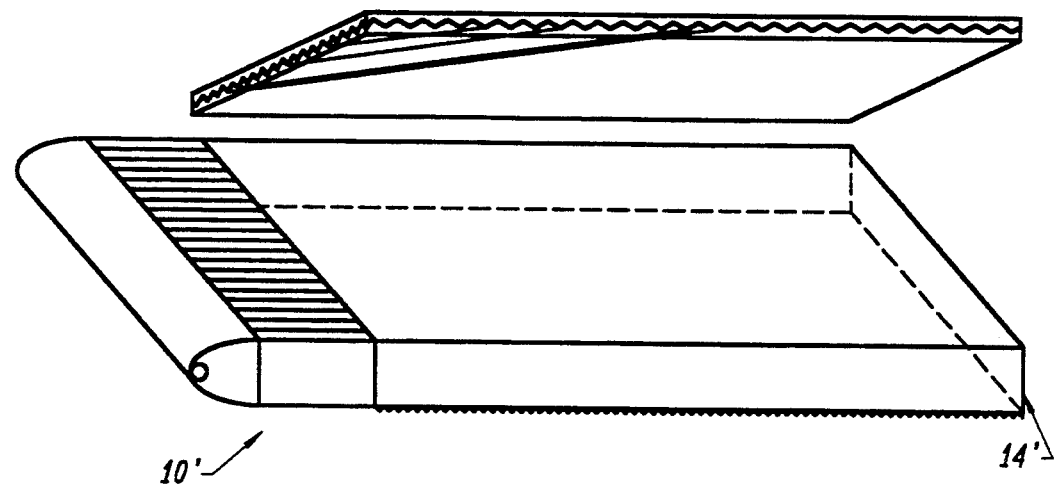
FIG. 9 is a perspective view illustrating the combination of the backlighting assembly of FIG. 6 and the retroreflecting sheet polarizer of FIG. 7.

Having described retroreflecting sheet polarizer 108, attention is now directed to the way it is used in combination with one of the previously described backlighting assemblies in an overall liquid crystal display system. The combination of polarizer 108 and backlighting assembly 14' is depicted in FIG. 9. As seen there, the polarizer is shown for purposes of description directly over and skewed upward above the top surface of light pipe 14' forming part of assembly 10'. In actual practice the polarizer is disposed in parallel confronting relationship with the top surface of light pipe 14' immediately below a cooperating liquid crystal display. In the particular embodiment illustrated, the microprisms forming part of the polarizer extend at 45° angles with the direction of the microprisms 42 forming part of microprism arrangement 36.

Figure 10:
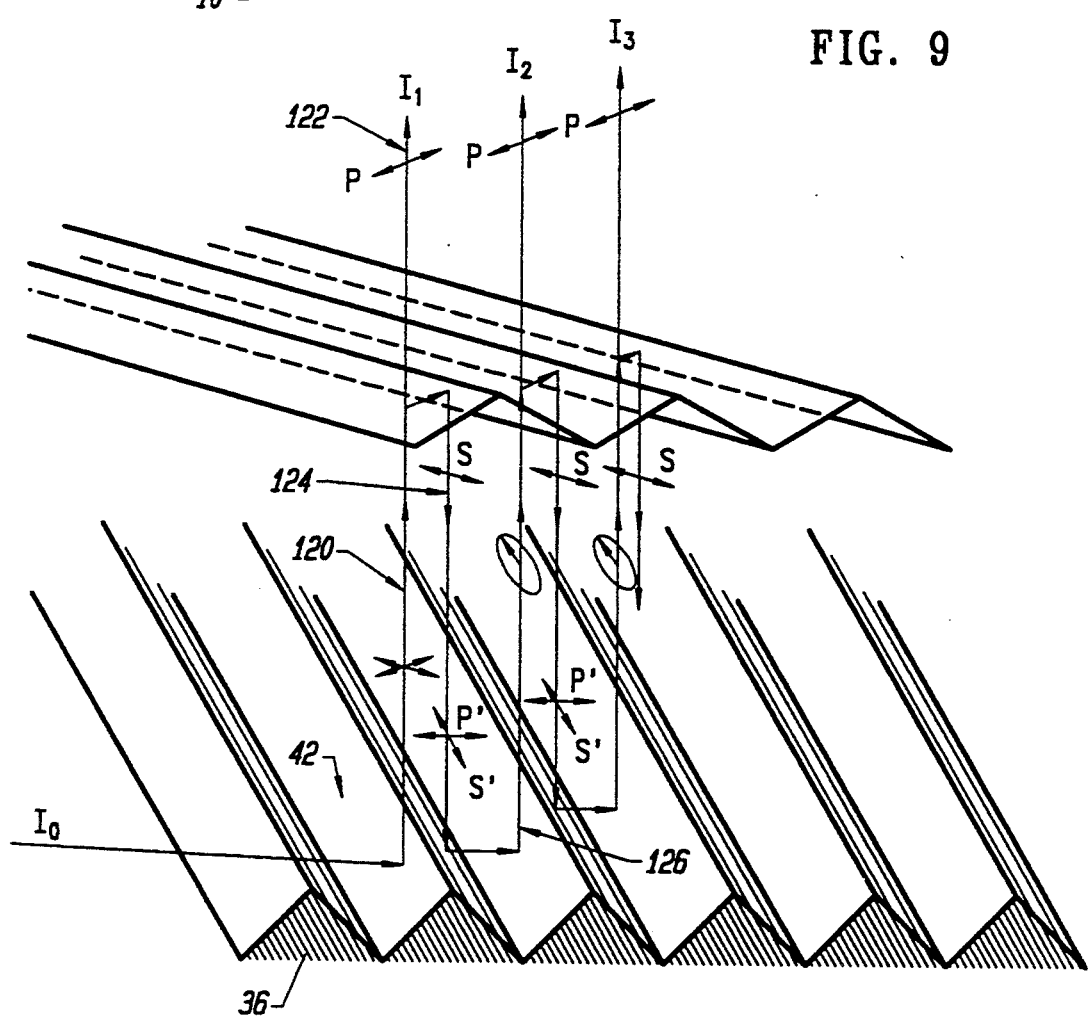
FIG. 10 diagrammatically illustrates the way in which an arrangement of microprisms forming part of the backlighting assembly of FIG. 8 cooperates with an arrangement of microprisms forming part of the retroreflecting sheet polarizer of FIG. 9 in order to polarize light in accordance with the present invention.

As shown in FIG. 10, a light ray 120 reflected upwards and out of the light pipe 14' from a cooperating microprism 42 propagates upward perpendicular to the bottom surface of the polarizer 108. Assume 50 percent of the light has the right polarization to be transmitted as indicated as p-polarized light 122 in FIG. 10. The component of light with the wrong polarization (indicated as s-polarized light 124) will be reflected by 180° and will propagate towards the prism arrangement 36. However, since the prism arrangement 36 extends at a 45° angle with that of the polarizer, the reflected beam, which is s-polarized for the polarizer, is not s-polarized for the arrangement 36. For this arrangement, the backwards reflected polarized light is decomposed again into p and s components for the prisms 42, as indicated at p' and s' in FIG. 10. Each component will have its phase angle changed by $\theta_S$ and $\theta_p$, respectively, after reflection at the surfaces on the prism. With the materials used, $2\theta_s - 2\theta_p$ (2 accounts for twice internal reflections shown in the diagram) has a value close to 90° and the light beam reflected towards the polarizer 108 becomes nearly circularly polarized light. Now, the circularly polarized light 126, just like the unpolarized light 120 will have equal amounts of s and p components for the polarizer. As a result, 50% of the circular polarized light will be transmitted through the polarizer again as p-polarized light, and the other half will be reflected as s-polarized light back towards the microprism arrangement 36. This process will repeat, and the total light transmitted through the polarizer is therefore $l_1 + l_2 + l_3 + \ldots = l_0$, where $l_0$ is the light initially entering the light pipe 14'. Although in reality losses will occur in each reflection, and the efficiency of conversions for unpolarized light to polarized light will therefore be somewhat smaller than the theoretical ideal value of 100%, gains in the conversion efficiency can still be close to a factor of 2.

It should be noted that FIG. 10 shows only one of the possible arrangements for enhancing the brightness of a liquid crystal display utilizing a backlighting assembly of the present invention in combination with a retroreflecting sheet protector. As a matter of fact, enhancement of the brightness of LCDs by converting all of the unpolarized light to the desired polarization can be achieved for all arrangements with the transmission axis of a retroreflecting polarizer which is neither parallel nor perpendicular to the microprism arrangement 36. Moreover, this combination can be used for providing more efficient polarization in applications other than liquid crystal displays. Finally, it is to be understood that the present invention is not limited to the particular dimensional characteristics provided herein, nor to the specific backlighting assembly embodiments illustrated.

We claim:

1. An assembly for backlighting a liquid crystal display, comprising:
   (a) a backlighting light pipe having opposing top and bottom surfaces and opposing sides and extending lengthwise between opposite ends;
   (b) means for directing light into said light pipe and for causing it to move from one end of the light pipe towards the opposite end thereof; and
   (c) an arrangement of immediately adjacent microprisms extending normal to the lengthwise axis of the light pipe from one side of said light pipe to its opposing side along the entire extent of and serving as the bottom surface of the light pipe, each of said microprisms having a triangular cross-section extending downward to a point so as to define from said point opposing, upwardly angled light reflecting surface segments for reflecting light within said light pipe upwards through its top surface in a generally collimated manner.

2. An assembly according to claim 1 wherein all of said microprisms are substantially identical in cross-sectional configuration.

3. An assembly according to claim 1 wherein said microprism arrangement includes a grooved underside, the groove coated with a light opaque, light reflecting coating to enhance reflection.

4. An assembly according to claim 2 wherein each of said microprisms defines an isosceles triangle in cross-section, the equal sides of which in turn define the microprism's opposing light reflecting surface segments.

5. An assembly according to claim 4 wherein each of said microprisms defines an angle of about 100° between its light reflecting surface segments.

6. An assembly according to claim 1 wherein said light pipe is divided into a series of longitudinally extending laterally adjacent light pipe sections which extend from one end of the light pipe to its other end and which are optically isolated from one another along substantially their entire lengths, whereby the individual light pipe sections act on incoming light substantially independently with respect to one another.

7. An assembly according to claim 1 wherein said means for directing light into said light pipe does so from at least one end thereof and includes means for limiting the maximum angle at which light enters the light pipe in relation to the lengthwise axis of the light pipe.

8. An assembly according to claim 7 wherein said microprisms are configured such that the light entering said light pipe and reflected off the angled surface segments of the microprisms is reflected towards the top surface of the light pipe at angles no greater than one-half said maximum angle with respect to lines normal to said top surface.

9. An assembly according to claim 8 wherein said microprisms define substantially identical isosceles triangles, each of which in turn defines an angle of 100° between its light reflecting surface segments and wherein said maximum angle of light entering one light pipe is no greater than 20°.

10. An assembly according to claim 1 wherein said means for directing light into said light pipe does so from at least one end thereof and includes light control means for limiting the maximum angle at which light enters the light pipe in relation to the lengthwise axis of the light pipe.

11. An assembly according to claim 10 wherein said light control means includes a light collimating light pipe having opposing top and bottom surfaces and opposing sides and extends lengthwise between opposite ends, said light collimating light pipe being disposed in end-to-end relationship with and directly adjacent to the light entering end of said back lighting light pipe and being divided into a series of longitudinally extending, laterally adjacent light pipe sections which are optically isolated from one another, each of said light pipe sections having its own opposing top and bottom surfaces and its own opposing sides.

12. An assembly according to claim 11 wherein said means for directing light into said backlighting light pipe includes a single light source extending across and adjacent to the end of said collimating light pipe opposite said backlighting light pipe, whereby light from said light source enters and propagates through each of the divided sections of the collimating light pipe before entering said backlighting light pipe.

13. An assembly according to claim 12 wherein selected ones of the sides and top and bottom surfaces of each of the divided sections of said collimating light pipe include optical coatings which are provided for internally reflecting only that light within the light pipe section which displays incident angles less than a predetermined value, whereby to enhance collimation of the light propagating through each of the divided light pipe sections.

14. An assembly according to claim 13 wherein said maximum angle is no greater than the arcsin $n_1/n_2$, where $n_1$ and $n_2$ are refractive indices of said optical coating and the collimating light pipe, respectively.

15. An assembly according to claim 13 wherein said backlighting light pipe is divided into a series of longitudinally extending laterally adjacent light pipe sections which extend from one end of the light pipe to its other end in end-to-end alignment with the divided sections of said collimating light pipe, and which are optically isolated from one another along substantially their entire lengths, whereby the individual light pipe sections act substantially independent with respect to one another.

16. An assembly according to claim 13 wherein said backlighting light pipe is divided into an upper section including its top surface and an optically isolated bottom section including its bottom surface, said light pipe including a series of longitudinally spaced optical coupling strips disposed between said upper and lower light pipe sections and extending from one side of the backlighting light pipe to the opposing side for optically coupling the upper and lower light pipe sections to one another.

17. An assembly according to claim 13 wherein said backlighting pipe is divided into a number of optically isolated layers, said light pipe including a series of longitudinally spaced optical coupling stripe disposed between said layers and extending from one side of the backlighting light pipe to the opposing side for optically coupling the layers to one another.

18. An assembly according to claim 17 wherein at least one of said layers is divided into two optically isolated sections.

19. An assembly according to claim 16 wherein said optical coupling strips progressively widen as a function of distance away from the light entering end of said backlighting light pipe while the spaces therebetween decrease in width.

20. An assembly according to claim 16 wherein said backlighting light pipe includes a Fresnel lens sheet on its top surface and wherein said optical coupling strips are divided in several sections, and such sections use coupling materials of different values of refractive index so that light of different deviation angles can be brought out and distributed systematically along the longitudinal direction of the backlight light pipe and can therefore be corrected by means of said Fresnel lens sheet to achieve a higher degree of collimation.

21. An assembly according to claim 20 wherein said microprisms display systematical changing of angles along the longitudinal direction of the light pipe so that the output light will propagate essentially normal to the surface of the light pipe in the said x-z plane.

22. An assembly according to claim 1 wherein said light pipe is intended to be positioned immediately behind said liquid crystal display so as to receive said generally collimated light, said assembly including a light diffusing light scattering plate member positionable in spaced apart confronting, parallel relationship with the top surface of said light pipe with the liquid crystal display therebetween so that the generally collimated light from said light pipe passes through said liquid crystal display and said plate member, said plate member being configured such that any image appearing thereon as a result of said collimated light does not change appreciably with changes in viewing angles.

23. An assembly according to claim 1 wherein said light entering said light pipe is unpolarized light, said assembly including means for linearly polarizing in a given polarity direction at least approximately half of the light directed out of said light pipe through the top surface thereof.

24. An assembly according to claim 23 wherein said polarizing means includes a polarization arrangement which cooperates with said arrangement of microprisms such that substantially all of the light directed out of said light pipe through the top surface thereof is linearly polarized in said given polarity direction.

25. An assembly according to claim 24 wherein said polarizing means includes a retroreflecting sheet polarizer containing a series of longitudinally extending, adjacent parallel microprisms, said retroreflecting sheet polarizer being positionable in parallel relationship with and in front of the top surface of said light pipe such that said microprisms extend in directions transverse but not perpendicular to the microprisms of said light pipe.

26. An assembly according to claim 25 wherein the microprisms of said retroreflecting sheet polarizer extend in directions which are at 45° angles with the microprisms of said light pipe.

27. An assembly for backlighting a liquid crystal display, comprising:
(a) a backlighting light pipe having opposing top and bottom surfaces and opposing sides and extending lengthwise between opposite ends, said light pipe being divided into a series of longitudinally extending laterally adjacent light pipe sections which extend from one end of the light pipe to its other end and which are optically isolated from one another along substantially their entire lengths, whereby the individual light pipe sections act substantially independently with respect to one another on incoming light;
(b) means for directing light into said light pipe and for causing it to move from one end of the light pipe towards the opposite end thereof; and
(c) an arrangement of microprisms extending normal to the lengthwise axis of the light pipe from one side of said light pipe to its opposing side along the entire extent of said serving as the bottom surface of the light pipe for reflecting light within said light pipe upwards through its top surface in a generally collimated manner.

28. An assembly according to claim 27 wherein said means for directing light into said light pipe does so from at least one end thereof and includes means for limiting the maximum angle at which light enters the light pipe in relation to the lengthwise axis of the light pipe.

29. An assembly according to claim 28 wherein said microprisms are configured such that the light entering said light pipe and reflected off the angled surface segments of the microprisms is reflected towards the top surface of the light pipe at angles no greater than one-half said maximum angle with respect to lines normal to said top surface.

30. An assembly according to claim 27 wherein said means for directing light into said light pipe does so from at least one end thereof and includes light control means for limiting the maximum angle at which light enters the light pipe in relation to the lengthwise axis of the light pipe.

31. An assembly according to claim 30 wherein said light control means includes a light collimating light pipe having opposing top and bottom surfaces and opposing sides and extends lengthwise between opposite ends, said light collimating light pipe being disposed in end-to-end relationship directly adjacent to the light entering end of said back lighting light pipe and being divided into a series of longitudinally extending, laterally adjacent light pipe sections which are optically isolated from one another, each of said light pipe sections having its own opposing top and bottom surfaces and its own opposing sides.

32. An assembly according to claim 31 wherein said means for directing light into said backlighting light pipe includes a single light source extending across and adjacent to the end of said collimating light pipe opposite said backlighting light pipe, whereby light from said light source enters and propagates through each of the divided sections of the collimating light pipe before entering said backlighting light pipe.

33. An assembly according to claim 32 wherein selected ones of the sides and top and bottom surfaces of each of the divided sections of said collimating light pipe include optical coatings which are provided for internally reflecting only that light within the light pipe section which displays incident angles less than a predetermined value, whereby to enhance collimation of the light propagating through each of the divided light pipe sections.

34. An assembly for backlighting a liquid crystal display, comprising:
(a) a backlighting light pipe having opposing top and bottom surfaces and opposing sides and extending lengthwise between opposite ends;
(b) an arrangement of microprisms extending normal to the lengthwise axis of the light pipe from one side of said light pipe to its opposing side along the entire extent of and serving as the bottom surface of the light pipe for reflecting light within said light pipe upwards through its top surface in a generally collimated manner; and
(c) means for directing light into said light pipe from at least one end thereof and for causing it to move from one end of the light pipe towards the opposite end thereof, said means for directing light into said light pipe including means for limiting the maximum angle at which light enters the light pipe in relation to the lengthwise axis of the light pipe to an angle no greater than a predetermined angle, said microprisms being configured such that the light entering said light pipe is reflected off the microprisms towards the top surface of the light pipe at angles no greater than one-half said maximum angle with respect to lines normal to said top surface.

35. An assembly for backlighting a liquid crystal display, comprising:
(a) a backlighting light pipe having opposing top and bottom surfaces and opposing sides and extending lengthwise between opposite ends;
(b) an arrangement of microprisms extending normal to the lengthwise axis of the light pipe from one side of said light pipe to its opposing side along the entire extent of and serving as the bottom surface of the light pipe for reflecting light within said light pipe upwards through its top surface in a generally collimated manner; and
(c) means for directing light into said light pipe from at least one end thereof and for causing it to move from one end of the light pipe towards the opposite end thereof, said means for directing light into said light pipe including light control means for limiting the maximum angle at which light enters the light pipe in relation to the lengthwise axis of the light pipe.

36. An assembly according to claim 35 wherein said light control means includes a light collimating light pipe having opposing top and bottom surfaces and opposing sides and extending lengthwise between opposite ends, said light collimating light pipe being disposed in end-to-end relationship directly adjacent to the light entering end of said back lighting light pipe and being divided into a series of longitudinally extending, laterally adjacent light pipe sections which are optically isolated from one another, each of said light pipe sections having its own opposing top and bottom surfaces and its own opposing sides.

37. An assembly for providing backlighting comprising:
(a) a backlighting light pipe having opposing top and bottom surfaces and opposing sides and extending lengthwise between opposite ends;

(b) means for directing light into said light pipe and for causing it to move from one end of the light pipe towards the opposite end thereof; and (c) an arrangement of immediately adjacent microprisms extending normal to the lengthwise axis of the light pipe from one side of said light pipe to its opposing side along the entire extent of and serving as the bottom surface of the light pipe, each of said microprisms having a triangular cross-section extending downward to a point so as to define from said point opposing, upwardly angled light reflecting surface segments for reflecting light within said light pipe upwards through its top surface in a generally collimated manner.

38. An assembly for providing backlighting comprising:

(a) a backlighting light pipe having opposing top and bottom surfaces and opposing sides and extending lengthwise between opposite ends, said light pipe being divided into a series of longitudinally extending laterally adjacent light pipe sections which extend from one end of the light pipe to its other end and which are optically isolated from one another along substantially their entire lengths, whereby the individual light pipe sections act substantially independently with respect to one another on incoming light;

(b) means for directing light into said light pipe and for causing it to move from one end of the light pipe towards the opposite end thereof; and (c) an arrangement of microprisms extending normal to the lengthwise axis of the light pipe from one side of said light pipe to its opposing side along the entire extent of said serving as the bottom surface of the light pipe for reflecting light within said light pipe upwards through its top surface in a generally collimated manner.

39. A liquid crystal display assembly, comprising:

(a) a backlighting light pipe having opposing top and bottom surfaces and opposing sides and extending lengthwise between opposite ends;

(b) means for directing unpolarized light into said light pipe and for causing it to move from one end of the light pipe towards the opposite end thereof;

(c) an arrangement of immediately adjacent microprisms serving as the bottom surface of the light pipe for reflecting light within said light pipe upwards through its top surface in a generally collimated manner;

(d) means for linearly polarizing in a given polarity direction the light directed out of said light pipe through the top surface thereof, said polarizing means including a polarization arrangement which cooperates with said arrangement of microprisms such that substantially all of the light directed out of said light pipe through the top surface thereof is linearly polarized in said given polarity direction, said polarizing means including a retroreflecting sheet polarizer containing a series of longitudinally extending, adjacent parallel microprisms, said retroreflecting sheet polarizer being positionable in parallel relationship with and in front of the top surface of said light pipe such that said microprisms extend in directions transverse but not perpendicular to the microprisms of said light pipe.

40. An assembly according to claim 39 wherein the microprisms of said retroreflecting sheet polarizer extend in directions which are at 45° angles with the microprisms of said light pipe.

* * * * *